United States Patent
Abreu Calfa et al.

(10) Patent No.: US 12,495,881 B2
(45) Date of Patent: Dec. 16, 2025

(54) INADVERTENT OPERATIONS IN TOUCHLESS LAVATORY

(71) Applicant: B/E Aerospace, Inc., Winston Salem, NC (US)

(72) Inventors: Bruno Abreu Calfa, Vernon, CT (US); Brett Israelsen, Glastonbury, CT (US); Matthew R. Pearson, Hartford, CT (US); Amit Surana, Newington, CT (US); Kunal Srivastava, Newington, CT (US)

(73) Assignee: B/E AEROSPACE, INC., Winston Salem, NC (US)

( * ) Notice: Subject to any disclaimer, the term of this patent is extended or adjusted under 35 U.S.C. 154(b) by 854 days.

(21) Appl. No.: 17/727,625

(22) Filed: Apr. 22, 2022

(65) Prior Publication Data
US 2023/0337808 A1     Oct. 26, 2023

(51) Int. Cl.
*E03D 5/10*    (2006.01)
*A45D 44/02*   (2006.01)
*G06F 3/01*    (2006.01)

(52) U.S. Cl.
CPC .................. *A45D 44/02* (2013.01)

(58) Field of Classification Search
CPC ........ B64D 11/00151; B64D 11/00153; B64D 11/0606; B64D 11/0015; B64D 11/00; B64D 2011/0069; G06F 3/017; G05B 19/00; G05B 19/02; G05B 19/04; G05B 19/042
See application file for complete search history.

(56) References Cited

U.S. PATENT DOCUMENTS

| | | | |
|---|---|---|---|
| 4,767,922 A | 8/1988 | Stauffer | |
| 5,455,971 A * | 10/1995 | Sakakibara | E03D 5/105 4/313 |

(Continued)

FOREIGN PATENT DOCUMENTS

| | | |
|---|---|---|
| CN | 108331114 | 7/2018 |
| CN | 110537865 | 12/2019 |

(Continued)

OTHER PUBLICATIONS

Reading the value of a sensor every X millis (best practise?), Jul. 2014, retrieved from—https://forum.arduino.cc/t/reading-the-value-of-a-sensor-every-x-millis-best-practise/247446, 10 pages (Year: 2014).*

(Continued)

*Primary Examiner* — Yongjia Pan
(74) *Attorney, Agent, or Firm* — SNELL & WILMER L.L.P.

(57) ABSTRACT

A method for controlling a touchless lavatory is disclosed herein. The method includes collecting, by a processor, sensor data from a sensor, the sensor data including an ambient light measurement and an indication of motion, aggregating, by the processor, the collected sensor data for a time window, extracting, by the processor, features from the aggregated sensor data, and determining, by the processor, a probability of an activity occurring based on the extracted features. The method further includes activating, by the processor, a motor based on the determining that the activity has a high probability of occurring.

15 Claims, 6 Drawing Sheets

(56) References Cited

U.S. PATENT DOCUMENTS

| | | | |
|---|---|---|---|
| 5,594,238 A | 1/1997 | Endruschat et al. | |
| 6,250,601 B1* | 6/2001 | Kolar | G01S 7/41 |
| | | | 251/129.04 |
| 7,516,939 B2* | 4/2009 | Bailey | E03D 5/105 |
| | | | 250/221 |
| 7,651,068 B2 | 1/2010 | Bailey | |
| 7,921,480 B2* | 4/2011 | Parsons | E03C 1/057 |
| | | | 250/221 |
| 8,097,851 B2 | 1/2012 | Chang et al. | |
| 8,407,821 B2* | 4/2013 | Chan | E03D 5/105 |
| | | | 4/406 |
| 9,323,985 B2* | 4/2016 | Heim | G06F 3/017 |
| 9,428,897 B2 | 8/2016 | Le et al. | |
| 9,822,514 B2 | 11/2017 | Parsons et al. | |
| 9,860,077 B2 | 1/2018 | Laurent et al. | |
| 10,172,503 B2* | 1/2019 | Wei | A47K 13/10 |
| 2002/0073484 A1* | 6/2002 | Nishioka | E03D 5/105 |
| | | | 4/304 |
| 2012/0001875 A1* | 1/2012 | Li | G06F 3/017 |
| | | | 345/177 |
| 2012/0050189 A1 | 3/2012 | Choboter et al. | |
| 2015/0020299 A1* | 1/2015 | Hsu | E03D 5/105 |
| | | | 4/313 |
| 2015/0205359 A1* | 7/2015 | Feng | G06F 3/017 |
| | | | 715/863 |
| 2016/0180175 A1* | 6/2016 | Bitton | G06V 20/52 |
| | | | 348/143 |
| 2017/0016221 A1* | 1/2017 | Yamamoto | E03D 5/105 |
| 2017/0051486 A1 | 2/2017 | Schomburg et al. | |
| 2017/0053401 A1* | 2/2017 | Hata | G06T 7/77 |
| 2017/0095125 A1* | 4/2017 | Tsuiki | E03D 5/105 |
| 2017/0183853 A1* | 6/2017 | Crist | E03D 5/105 |
| 2019/0090056 A1* | 3/2019 | Rexach | G06F 3/167 |
| 2020/0064456 A1* | 2/2020 | Xu | G01S 13/765 |
| 2020/0349347 A1* | 11/2020 | Morzhakov | G06V 20/52 |
| 2021/0054608 A1* | 2/2021 | Denzin | B23P 19/00 |
| 2021/0301512 A1 | 9/2021 | Wülker | |
| 2021/0333351 A1* | 10/2021 | Zandifar | G01S 7/415 |
| 2022/0010891 A1 | 1/2022 | Bush et al. | |
| 2022/0049867 A1* | 2/2022 | Rexach | F24F 7/003 |
| 2022/0107632 A1* | 4/2022 | Sinha | G06Q 50/06 |

FOREIGN PATENT DOCUMENTS

| | | | | |
|---|---|---|---|---|
| CN | 111239844 A | * | 6/2020 | A61L 2/10 |
| CN | 107169453 B | * | 7/2020 | G06K 9/00362 |
| CN | 111395471 A | * | 7/2020 | A47K 13/10 |
| CN | 111506129 | | 8/2020 | |
| CN | 113064367 A | * | 7/2021 | G01V 8/005 |
| CN | 214335913 U | * | 10/2021 | |
| CN | 113297938 B | * | 5/2024 | G06V 40/103 |
| EP | 2011929 | | 2/2013 | |
| JP | 2005335822 | | 12/2005 | |
| JP | 2006188902 | | 7/2006 | |
| JP | 2018040222 | | 3/2018 | |
| TW | 201445029 A | * | 12/2014 | A63B 24/0006 |
| WO | WO-2016177670 A1 | * | 11/2016 | E03D 5/105 |
| WO | 2021102103 | | 5/2021 | |

OTHER PUBLICATIONS

Dehghani et al., A Quantitative Comparison of Overlapping and Non-Overlapping Sliding Windows for Human Activity Recognition Using Inertial Sensors, Oct. 1, 2019, retrieved from—https://pmc.ncbi.nlm.nih.gov/articles/PMC6891351/pdf/sensors-19-05026. pdf, 19 pages (Year: 2019).*

Raykov et al., Predicting room occupancy with a single passive infrared (PIR) sensor through behavior extraction, Sep. 12-16, 2016, retrieved from—https://dl.acm.org/doi/pdf/10.1145/2971648.2971746, 12 pages (Year: 2016).*

Ashleibta et al., 5G-enabled contactless multi-user presence and activity detection for independent assisted living, Sep. 2, 2021, retrieved from—https://www.nature.com/articles/s41598-021-96689-7, 15 pages (Year: 2021).*

Soltanaghaei et al., Robust and Practical WiFi Human Sensing, Nov. 18-20, 2020, retrieved from—https://dl.acm.org/doi/pdf/10.1145/3408308.3427983, 10 pages (Year: 2020).*

Gaglio et al.,, Human Activity Recognition Process Using 3-D Posture Data, Oct. 2015, retrieved from—https://ieeexplore.ieee.org/stamp/stamp.jsp?tp=&arnumber=6990523&tag=1, 12 pages (Year: 2015).*

Liu et al., Wireless Sensing for Human Activity: A Survey, 2020, retrieved from—https://ieeexplore.ieee.org/stamp/stamp.jsp?tp=&arnumber=8794643, 17 page (Year: 2020).*

European Patent Office, European Search Report dated Sep. 8, 2023 in Application No. 23169605.5.

European Patent Office, European Office Action dated Mar. 12, 2025 in Application No. 23169605.5.

* cited by examiner

INADVERTENT OPERATIONS IN TOUCHLESS LAVATORY

FIELD

The present disclosure generally relates to touchless lavatories, and more specifically to monitoring and managing sensors within touchless lavatories.

BACKGROUND

Sensors are being increasingly used in lavatories to control the operations of the sink, soap dispenser, and toilet. As lavatories include more sensors there is an increased risk of inadvertently trigger the different sensors in the lavatory. Inadvertently triggering sensors in a lavatory can be wasteful of resources, such as soap and water, and can startle the user of the lavatory causing an uncomfortable experience. As sensors are included in more compact spaces, such as airplanes, the potential for inadvertently triggering sensors in the lavatory increases.

SUMMARY

A method of controlling a touchless lavatory is disclosed herein. The method includes collecting, by a processor, sensor data from a sensor, the sensor data including an ambient light measurement and an indication of motion, aggregating, by the processor, the collected sensor data for a time window, extracting, by the processor, features from the aggregated sensor data, and determining, by the processor, a probability of an activity occurring based on the extracted features. The method further includes activating, by the processor, a motor based on the determining that the activity has a high probability of occurring.

In various embodiments, wherein the sensor data is collected at discrete time intervals of about 0.05 seconds to about 0.5 seconds.

In various embodiments, the time window is about 0.5 seconds to about 2 seconds.

In various embodiments, the determining the probability of the activity occurring includes using at least one pretrained classification model to determine the probability of the activity.

In various embodiments, at least one pretrained classification model includes a first pretrained classification model to determine an occupancy status, a second pretrained classification model to determine a sitting status, and a third pretrained classification model to determine a gesture status.

In various embodiments, the second pretrained classification model further determines an orientation status.

In various embodiments, the time window begins when a previous window ends.

Also disclosed herein is a lavatory sensor control system. The lavatory sensor control system includes a sensor configured to transmit sensor data, a motor coupled to the sensor, and a controller. The controller is operatively coupled with each of the sensor and the motor, wherein the controller is configured to receive the sensor data, decide to perform an action based on the received sensor data, and transmit instructions to the motor.

In various embodiments, the decision to perform the action further includes extracting features from the sensor data, determining a probability of a gesture based on the extracted features using one or more pretrained machine learning classification models, and decide the action to perform based on the probability of the gesture occurring.

In various embodiments, the sensor data includes an ambient light measurement and an indication of motion.

In various embodiments, each sensor is configured to transmit the sensor data at discrete time intervals of about 0.05 seconds to about 0.5 seconds.

In various embodiments, the controller is further configured to aggregate the sensor data over a time window of a about 0.5 seconds to about 2 seconds.

In various embodiments, the time window overlaps with a previous time window.

In various embodiments, the time window begins at the end of a previous time window.

In various embodiments, the controller further includes a machine learning module including a first pretrained machine learning classifier model configured to determine a probability of occupancy, a second pretrained machine learning classifier model configured to determine a probability of sitting, and a third pretrained machine learning classifier model configured to determine a probability of a gesture being performed.

Also disclosed herein is a method for controlling a touchless lavatory. The method includes receiving, by a processor, a triggering event, determining, by the processor, that a space is occupied, determining, by the processor, a state of a user within the space, and performing, by the processor, an action in response to the state of the user.

In various embodiments, the state of the user includes one of sitting and standing.

In various embodiments, the method further includes determining, by the processor, a gesture of a user within the space and performing, by the processor, an action in response to the determined gesture.

In various embodiments, the action of the user includes a movement of user of at least one of a hand, an arm, a foot, and a leg.

In various embodiments, the method further includes determining, by the processor, a second action of the user within the space and performing, by the processor, a second action in response to the determined user second action.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
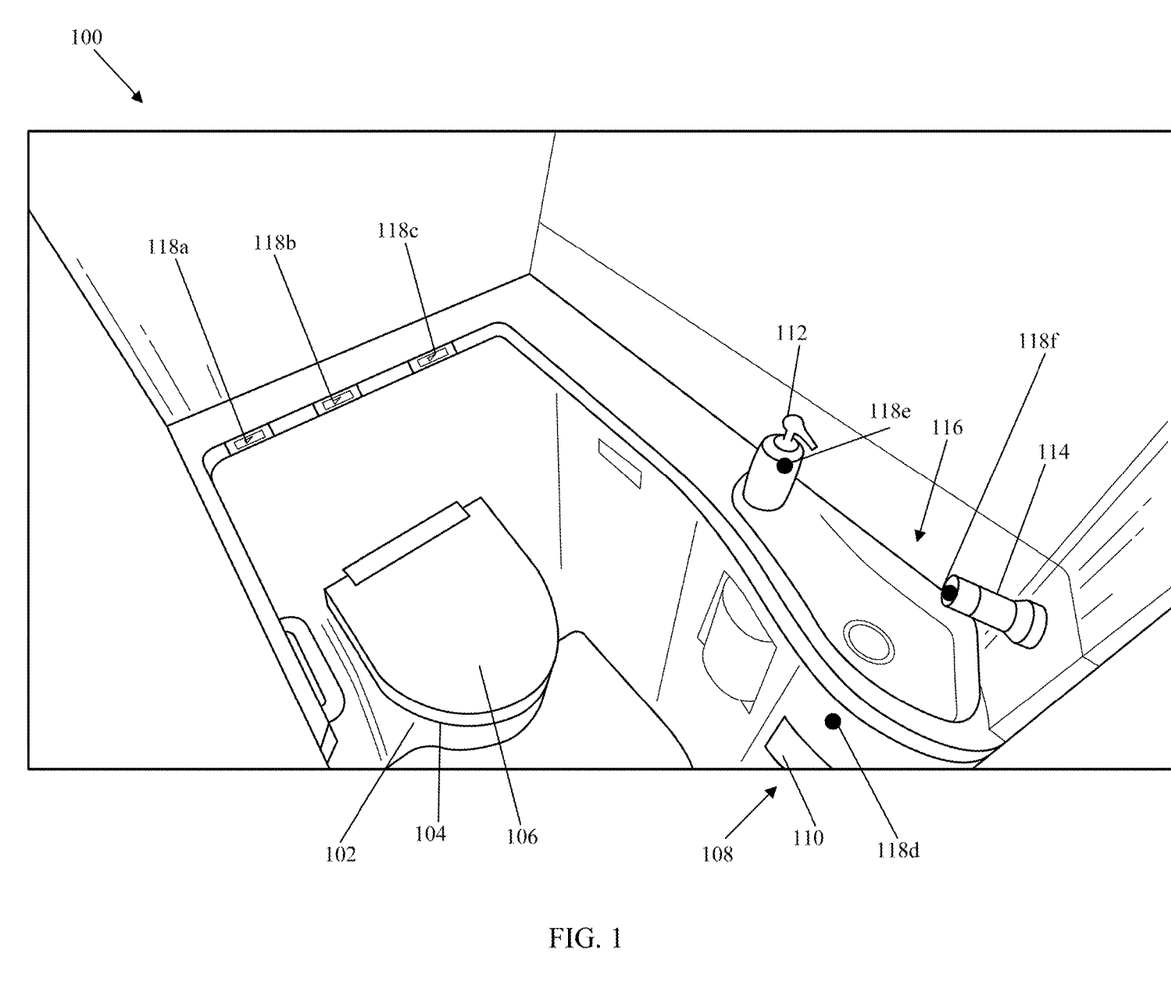
FIGS. 1-2 illustrate perspective views of a touchless lavatory and sensors, according to various embodiments of the present disclosure.

Referring to FIG. 1, in accordance with various embodiments, an exemplary touchless lavatory 100 is illustrated. Touchless lavatory 100 may be implemented in a variety of locations including an aircraft, a train, and an office building. Touchless lavatory 100 includes components such as a toilet 102 having a cover 104 and a seat 106, a trash can 108 with a flap 110, a soap dispenser 112, a faucet 114, and a sink 116. The cover 104 moves up and down in order to use the toilet 102 in a seated position. The cover 104 and seat 106 moves up and down in order to use the toilet 102 in a standing position. The flap 110 moves in and out to allow for disposal of garbage into trash can 108. Motors, or actuators, are located within the touchless lavatory to operate each of the toilet 102, cover 104, seat 106, flap 110, soap dispenser 112, and faucet 114. The motors may be located near or within the component which the motor controls.

Touchless lavatory 100 further includes a number of sensors 118a-118f. Each of the sensors 118a-118f is associated with a component and the associated motor within touchless lavatory 100. For example, sensor 118a may be associated with the toilet 102, and more specifically with flushing the toilet 102; sensor 118b may be associated with the cover 104; sensor 118c may be associated with the seat 106; sensor 118d may be associated with the flap 110; sensor 118e may be associated with the soap dispenser 112; and sensor 118f may be associated with the faucet 114. Each sensor 118a-118f may include an ambient light sensor and a proximity sensor. The ambient light sensor detects the amount of light reaching the sensor 118a-118f. The proximity sensor detects how close an object is to the sensor 118a-118f and/or movement near the sensor 118a-118f, thereby providing an indication of motion near the sensor 118a-118f. For example, when sensor 118a detects movement, such as via its proximity sensor, it will activate the motor associated with toilet 102, thereby flushing the toilet 102. Similarly, when sensor 118b detects movement, such as via its proximity sensor, it will active the motor associated with cover 104 and raise or lower cover 104. Likewise, when sensor 118c detects movement, such as via its proximity sensor, it will activate the motor associated with seat 106 and raise or lower seat 106. Similarly, when sensor 118d detects movement, such as via its proximity sensor, it will activate the motor associated with flap 110 and open or close flap 110. Likewise, when sensor 118e detects movement, such as via its proximity sensor, it will activate the motor associated with the soap dispenser 112 and dispense soap. Similarly, when sensor 118f detects movement, such as via its proximity sensor, it will activate the motor associated with faucet 114 to turn on faucet 114 allowing water to flow into sink 116.

In various embodiments, there are sensors located in the ceiling of the lavatory that activate the lavatory light when triggered. In various embodiments, there may be multiple sensors located along the ceiling to aid in determining a desired action to be performed.

Figure 2:
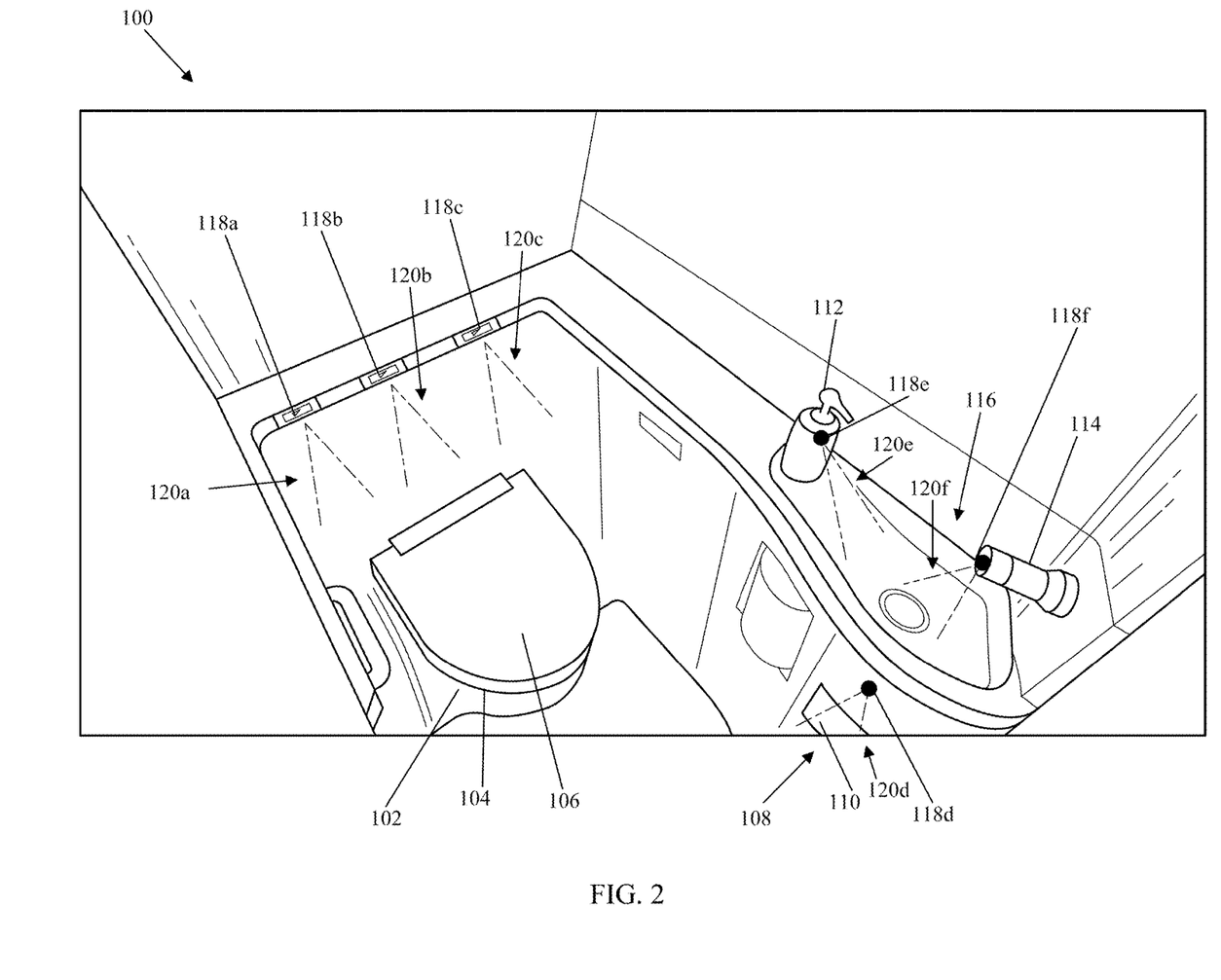

Referring now to FIG. 2, a sensing area 120a-120f of the sensors 118a-118f is depicted with respect to the touchless lavatory 100, according to various embodiments of the present disclosure. The sensing area 120a-120f, also referred to as a cone, indicates the area of proximity detection for each of the sensors 118a-118f. Such that sensing area 120a depicts the area of proximity detection of sensor 118a; sensing area 120b depicts the area of proximity detection of sensor 118b; sensing area 120c depicts the area of proximity detection of sensor 118c; sensing area 120d depicts the area of proximity detection of sensor 118d; sensing area 120e depicts the area of proximity detection of sensor 118e; and sensing area 120f depicts the area of proximity detection of sensor 118f. According to various embodiments, the sensors 118a-118f may be configured to increase or decrease the sensitivity of sensors 118a-118f thereby increasing or decreasing the sensing areas 120a-120f in a horizontal and/or a vertical plane. In various embodiments the sensitivity of the sensors may be set between about 1 cm to about 25 cm, between about 3 cm and about 15 cm, and between about 5 cm and about 10 cm. The sensitivity may depend on proximity to other sensors and/or components within the touchless lavatory 100.

The depicted configurations of the components (e.g., toilet 102, cover 104, seat 106, flap 110, soap dispenser 112, and faucet 114) and sensors 118a-118f for illustrative and discussion purposes only and are not meant to be limiting. While the disclosure refers to the touchless lavatory 100 as depicted in the depicted arrangement of FIGS. 1 and 2, the disclosure nevertheless contemplates different arrangements, configurations, numbers, placements, and types of the components and sensors of the touchless lavatory 100.

Given the proximity of components of the touchless lavatory 100, the locations of sensors 118a-118f, and the sensing area 120a-120f of each sensor 118a-118f, it can be appreciated that there may be inadvertent activations of the sensors 118a-118f and components within the touchless lavatory 100. The inadvertent activations can be overcome as discussed below.

Figure 3:
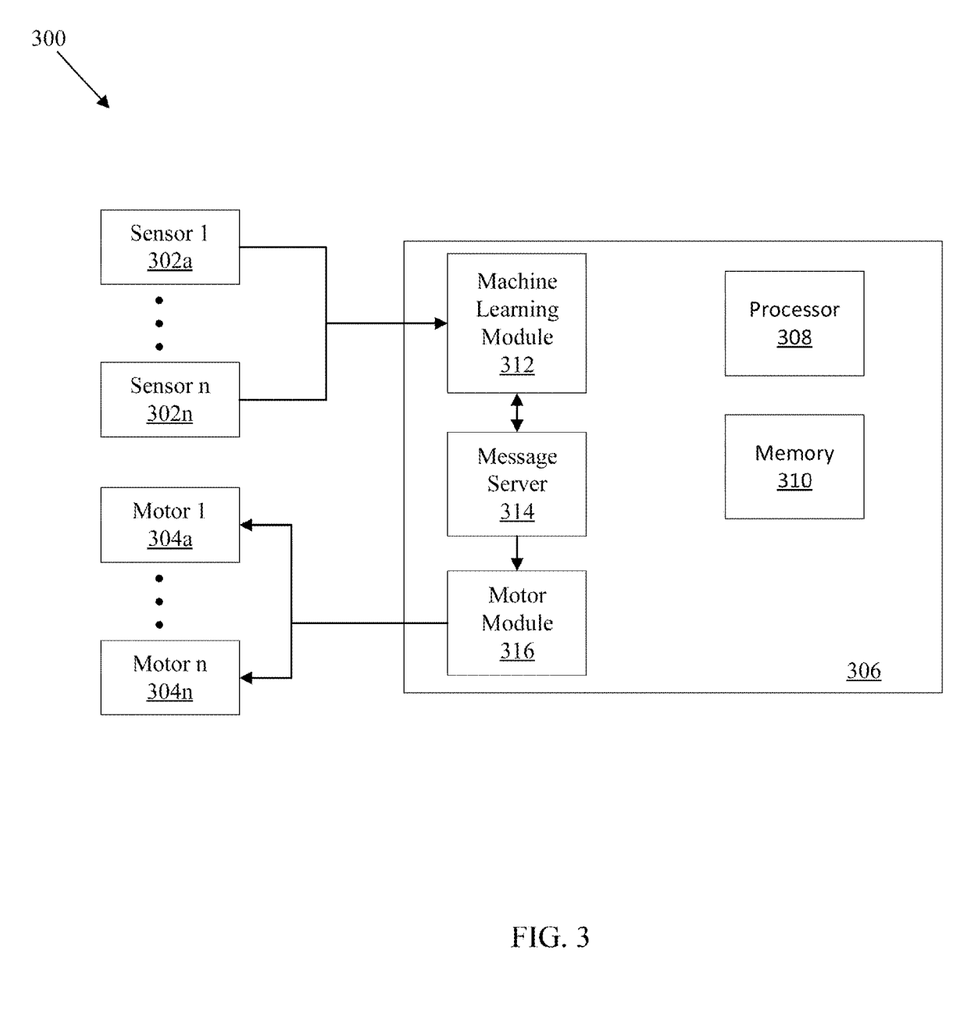
FIG. 3 illustrate an exemplary system architecture for controlling the touchless lavatory, according to various embodiments of the present disclosure.

Referring now to FIG. 3, in accordance with various embodiments of the present disclosure, an exemplary system architecture 300 for controlling the touchless lavatory 100 is illustrated. In various embodiments, system architecture 300 may be used to control motors attached to sensors within a given space. System architecture 300 includes a plurality of sensors 302a-302n, a plurality of motors, or actuators, 304a-304n, and a system controller 306. As depicted, the system controller 306 includes a processor 308, a memory 310, a machine learning module 312, a message server 314, and a motor module 316. The components within system controller 306 are presented for illustrative and discussion purposes and are not intended to be limiting. System controller 306 may include additional modules and/or components and modules may be removed from system controller 306 while staying within the scope of the present disclosure.

In various embodiments, sensors 302a-302n may include sensors 118a-118f and may provide proximity and ambient light data to system controller 306. Sensors 302a-302n are configured to transmit the sensor data to system controller 306. In various embodiments, sensors 302a-302n may include more or fewer sensors and different data types than those described above with respect to FIGS. 1 and 2. In various embodiments, sensors 302a-302n may have different placements and configurations than those described above with respect to FIGS. 1 and 2. However, for simplicity and discussion purposes sensors 302a-302n will be referred to as including sensors 118a-118f and an additional overhead sensor (e.g., on the ceiling of the touchless lavatory 100). Each of sensors 302a-302n provide data to system controller 306 for use in monitoring and managing the touchless lavatory 100.

In various embodiments, motors 304a-304n may be the motors associated with sensors 118a-118f described above and be designed to control toilet 102, cover 104, seat 106, flap 110, soap dispenser 112, and faucet 114. In various embodiments, motors 304a-304n may include additional motors in different configurations within the touchless lavatory 100. While system architecture 300 may support additional motors and features, for simplicity and the discussion purposes the motors described above with respect to FIGS. 1 and 2 will be used below. Each of motors 304a-304n may be independently controlled by system controller 306.

System controller 306 provides monitoring, management, and control capabilities for the touchless lavatory 100. System controller 306 receives sensor data from sensors 302a-302n, analyzes the sensor data, determines an appropriate action, and controls motors 304a-304n in perform the appropriate action.

Processor 308 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof.

Memory 310 stores executable instructions and data to implement control logic of system controller 306, including processor 308. Memory 310 may comprise a tangible, non-transitory storage medium and may store data used, for example, storing machine learning models and decision logic.

Machine learning module 312 may be a software module that may be executed by processor 308 and stored on memory 310. In various embodiments, machine learning module 312 may comprise one or more modules such as one or more machine learning model modules and a decision making logic module designed for the touchless lavatory 100. The one or more machine learning models may be classification models. In various embodiments, the classification models are pretrained prior to use in the touchless lavatory 100. In various embodiments, machine learning module 312 receives the sensor data from another module or hardware component. Machine learning module 312 receives the sensor data from sensors 302a-302n, analyzes the sensor data, and provides an action to perform. Machine learning module 312 may then send a message to message server 314 indicating the action to perform. For example, machine learning module 312 may receive the sensor data, analyze the sensor data, and determine that a user is activating faucet 114. Machine learning module 312 sends a message to message server 314 indicating that the user is activating the faucet.

Message server 314 manages the messaging between machine learning module 312 and motor module 316. In various embodiments, message server 314 is omitted and machine learning module 312 and motor module 316 communicate directly with one another. In various embodiments, the sensor data provided by sensors 302a-302n is routed through message server 314 to machine learning module 312. In various embodiments, message server 314 may be utilize a standard messaging protocol such as MQ Telemetry Transport (MQTT) to provide messaging capability between motor module 316 and machine learning module 312. Message server 314 receives commands from machine learning module 312 and sends them to motor module 316.

Motor module 316 receives commands from machine learning module 312 and provides commands to motors 304a-304n. In various embodiments, motor module 316 is connected directly to each motor 304a-304n and controls each motor 304a-304n directly. In various embodiments, motor module 316 communicates with another component such as a module or controller to control motors 304a-304n.

Figure 4:
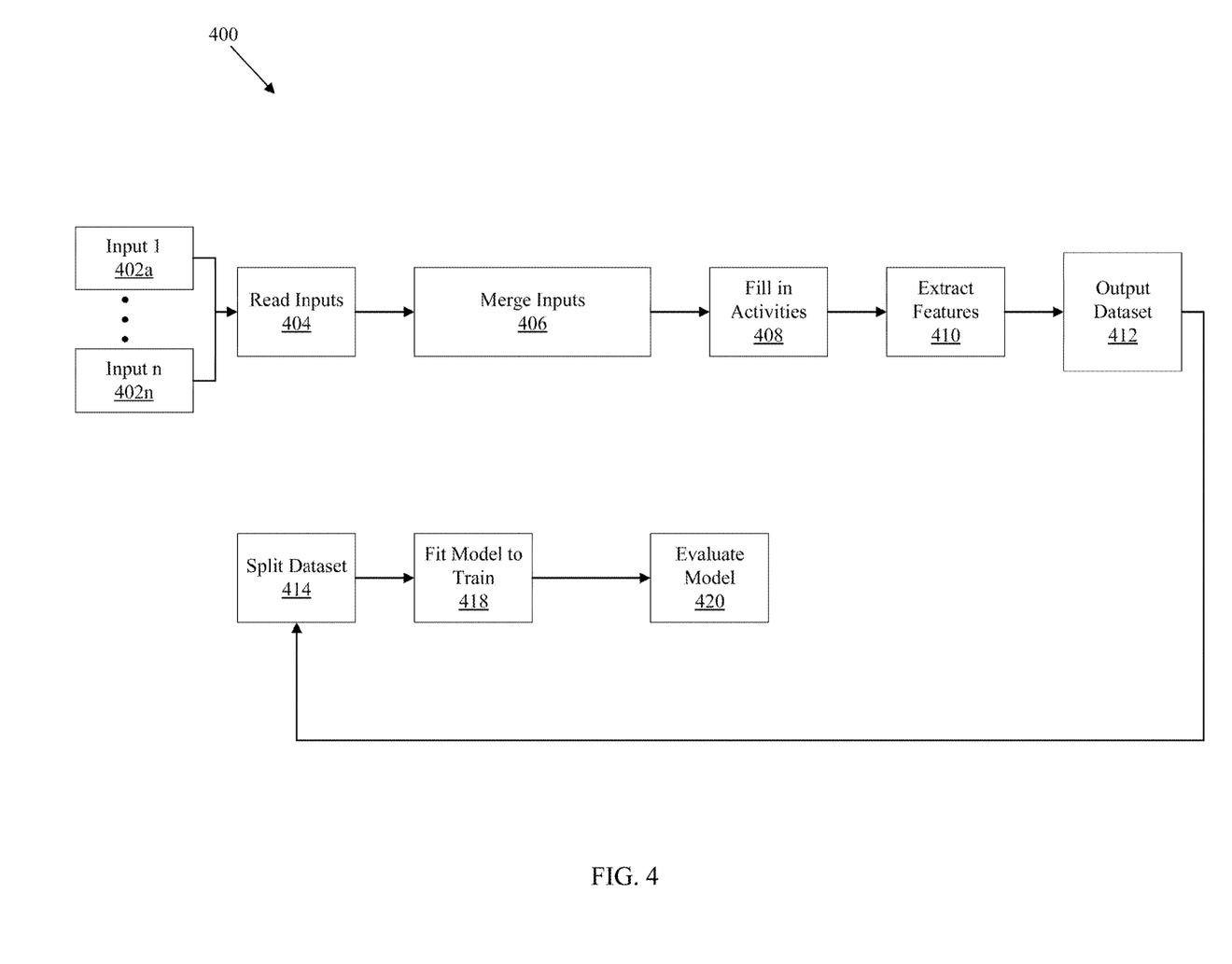
FIG. 4 illustrates a flow diagram of training a machine learning models for use in the touchless lavatory, according to various embodiments of the present disclosure.

Referring now to FIG. 4, in accordance with various embodiments of the present disclosure, an exemplary method 400 for training one or more machine learning models is illustrated. In various embodiments, method 400 may be performed by processor 308. In various embodiments, method 400 may be performed by one or more processors in one or more computer systems. For simplicity, the discussion below will refer to processor 308 though other processors and/or systems can be used to perform method 400. Furthermore, references will be made in the discussion below to sensors which may be sensors 118a-118f and/or sensors 302a-302n described above with respect to FIGS. 1-3.

At block 404, processor 308 reads inputs 402a-402n. In various embodiments, processor 308 reads inputs 402a-402n from one or more files. In various embodiments, processor 308 reads inputs 402a-402n from one or more databases. In various embodiments, inputs 402a-402n may be sensor data and user activity. For example, the sensor data may a list of sensor values at discrete time intervals over a period of time and the user activity may be a list of user activities at the discrete time intervals over the period of time. User activities may include standing, sitting, flushing the toilet, washing hands, using the trash, using the soap, entering, and/or exiting just to name a few. Inputs 402a-402n may be provided as in any format such as text, binary, image, video, audio, etc.

At block 406, processor 308 merges inputs 402a-402n correlating the data from each input to the data of each other input. For example, where sensor data is provided as a text file, user activity is provided as a text file, and video of the user is provided, the inputs may be merged to identify at each frame of the video the intended activity of the user and the sensor data provided by the sensors. In this example, the frame of the video takes place of a time stamp. In various embodiments, the inputs 402a-402n may be merged in appropriate ways for the data types of each input.

At block 408, processor 308 fills activities into the merged data received from block 406. In various embodiments, the activities may be provided by one or more of inputs 402a-402n. In various embodiments, the activities may be provided directly into the machine learning process. The activities may be defined as narrow or as broad as necessary for the intended task. For example, an activity may be defined as standing and may allow for a user to stand anywhere within the touchless lavatory 100. Alternatively, the activity may be defined more narrowly and be defined as standing in front of sink or standing in front of toilet.

At block 410, processor 308 extracts one or more features from the data. During feature extraction, processor 308 summarizes the aggregated input data as a mean, a mode, a standard deviation, or other data format. The feature extraction may be performed based on data within a time window, or over a period of time. The time window may have a length (e.g., size of the time window) and a stride (e.g., overlap of adjacent time windows). The time window may be based on the frequency of sensor measurements. In some examples, the time window may be about 0.1 seconds. In some examples, the time window may be about 0.05 seconds to about 0.5 seconds. And in some examples, the time window may be about 0.01 seconds to about 1 second. The time window may be adjusted to account for the rate at which data is collected, the desired responsiveness, and available resources. In various embodiments, the stride may be about 10% of the time window. For example, the last 10% of the current time window and first 10% of the next time window overlap. In various embodiments, the stride may be about 5% to about 15% of the time window. In various embodiments, the stride may be about 0% to about 25% of the time window. That is, in some examples, there is no overlap and the next time window begins when the previous time window ends. Processor 308 uses the time window and the stride to analyze the input data to extract the features from the data.

At block 412, processor 308 outputs a dataset with the extracted features. The dataset may include the input data with the extracted features correlated to the input data. The data may be output to file, a database, or another storage structure.

At block 414, processor 308 splits the dataset into a test dataset and a train dataset. In various embodiments, processor 308 splits the dataset in a deterministic manner. For example, the test dataset may be the first half of the dataset and the train dataset may be the second half of the dataset. As another example, the dataset may be split alternating each data point between the test dataset and the train dataset. In various embodiments, processor 308 splits the dataset randomly between the test dataset and the train dataset. In various embodiments, the train dataset is larger than the test dataset. In some examples, the train dataset is twice the size of the test dataset. In some examples, the train dataset is about two to four times larger than the test dataset.

At block 418, processor 308 trains one or more models using the train dataset. Each of the one or more models may be trained to identify different features within the dataset. The one or more models may be the same kind of model or different kinds of models. For example, one model may be a random forest model and another model may be an XGBoost model and another may be based on deep learning model. The training may include group splitting and/or hyperparameter tuning with stratified group cross validation.

At block 420, processor 308 evaluates the trained one or more models using the test dataset. Each of the one or more models is tested for accuracy in identifying the user activity. One or more of the one or more models may be retrained to improve the accuracy. In various embodiments, one or more of the one or more models may be retrained to identify different configurations of the touchless lavatory 100.

Figure 5:
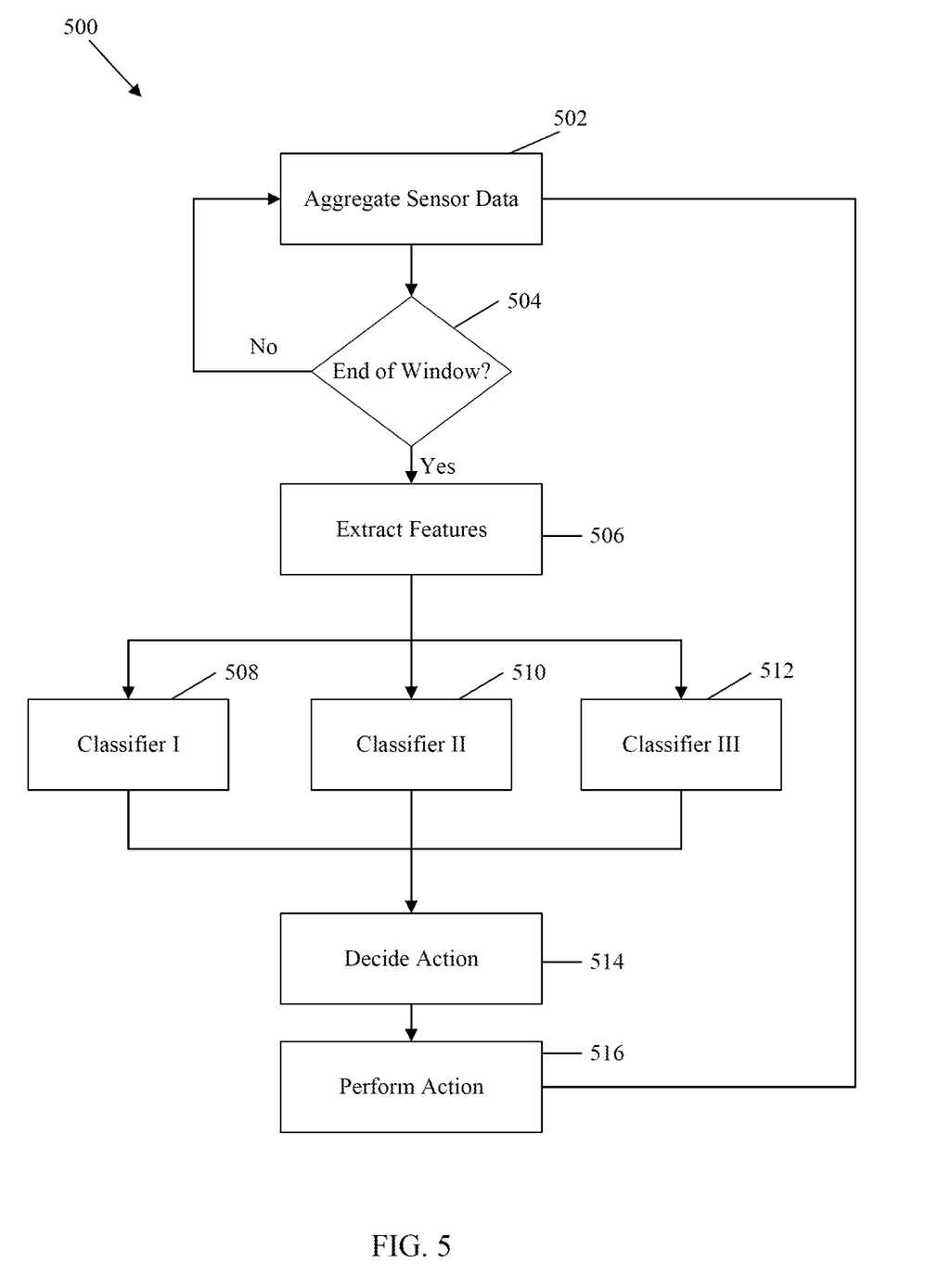
FIG. 5 illustrates a flow diagram for controlling the touchless lavatory, according to various embodiments of the present disclosure.

Referring to FIG. 5, in accordance with various embodiments of the present disclosure, illustrated is a method 500 for controlling the touchless lavatory 100. In various embodiments, method 500 may be performed by processor 308. In various embodiments, method 500 may be performed by one or more processors in one or more computer systems. For simplicity, the discussion below will refer to processor 308 though other processors and/or systems can be used to perform method 500. Furthermore, references will be made in the discussion below to sensors which may be sensors 118a-118f and/or sensors 302a-302n described above with respect to FIGS. 1-3.

At block 502, processor 308 aggregates the streaming sensor data. The sensors (e.g., sensors 118a-118f or 302a-302n) may be running asynchronously to process 500 and may be continuously streaming data to processor 308. In various embodiments, processor 308 aggregates, or buffers, streaming sensor data from sensors 118a-118f. In various embodiments, processor 308 aggregates, or buffers, streaming sensor data from sensors 302a-302n. Processor 308 stores the aggregated sensor data for future processing. The streaming sensor data may include movement data, proximity data, and/or ambient light data. In various embodiments, the streaming sensor data may include other information including sensor location, sensor type, etc. Processor 308 may aggregate, or buffer, one sample of sensor data about every 0.1 seconds. In various embodiments, processor 308 may aggregate, or buffer, one sample of sensor data about every 0.05 seconds to about 0.5 seconds. In various embodiments, processor 308 may aggregate, or buffer, one sample of sensor data about every 0.01 seconds to about every 1 second. Shorter times between samples may use more memory and processing power due to larger datasets. Longer times between samples may reduce the responsiveness of the touchless lavatory 100.

At block 504, processor 308 determines whether the end of the time window is reached. In various embodiments, the time window may be about 0.1 seconds. In various embodiments, the time window may be about 0.05 seconds to about 0.5 seconds. In various embodiments, the time window may be about 0.01 seconds to about 1 second. The time window may be adjusted to account for the rate at which data is collected, the desired responsiveness, and available resources. If it is determined that the end of the time window has not been reached, the method 500 returns to block 502 to collect sensor data.

If, instead, it is determined that the time window has ended, the method 500 proceeds to block 506.

At block 506, processor 308 extracts features from the aggregated sensor data. Feature extraction may include summarizing values within the dataset to determine a mean, standard deviation, or other measurement. Processor 308 categorizes the aggregated sensor data collected during the time window for later processing and prediction. The features may be extracted based on a time period, based on one sensor, and/or based on more than one sensor. The cumulative information within the dataset is used for further processing in the following steps.

At block 508, processor 308 applies a first classifier to the aggregated sensor data and the extracted features. The first classifier may be a standard machine learning model such as a random forest model, an XGBoost model, or some other model. In various embodiments, the first classifier may be a pretrained classification model. The first classifier may determine a probability that the touchless lavatory 100 is occupied based on the provided aggregated sensor data and extracted features. That is, the first classifier may infer a state of the touchless lavatory 100, occupied or unoccupied. In various embodiments, processor 308 may add a temporal smoothing step to the classification of the aggregated sensor data and extracted features. For example, processor 308 may infer an occupied state based on a rolling window of outputs from the first classifier such that the inferred state is based on the rolling window. As an example, an occupied state may be inferred when three or more outputs from the first classifier out of a previous five outputs infer an occupied state.

At block 510, processor 308 applies a second classifier to the sensor data and the extracted features. The second classifier may be a standard machine learning model such as a random forest model, an XGBoost model, or some other model. In various embodiments, the second classifier may be the same type of model as the first classifier. In various embodiments, the second classifier is a different type of model than the first classifier. In various embodiments, the second classifier may be a pretrained classification model. The second classifier may determine a probability that a user of the touchless lavatory 100 is sitting or standing. In various embodiments, the second classifier may determine a probability that the user facing a certain direction (e.g., orientation) within the touchless lavatory 100. That is, the second classifier may infer a state of the user within the touchless lavatory 100, either sitting or standing, as well as a direction that the user is facing (e.g., orientation). In various embodiments, processor 308 may add a temporal smoothing step to the classification of the aggregated sensor data and extracted features. For example, processor 308 may infer a sitting, or standing, state based on a rolling window of outputs from the second classifier such that the inferred state is based on the rolling window. As an example, a sitting state may be inferred when three or more outputs from the first classifier out of a previous five outputs infer a sitting state.

At block 512, processor 308 applies a third classifier to the sensor data and the extracted features. The third classifier may be a standard machine learning model such as a random forest model, an XGBoost model, or some other model. In various embodiments, the third classifier may be the same type of model as the first classifier and/or second classifier. In various embodiments, the third classifier is a different type of model than the first classifier and/or second classifier. Different machine learning models may be better at identifying certain characteristics than others such that one machine learning model is better at identifying whether a user is sitting or standing and another machine learning model is better at identifying whether a user is gesturing, or moving an arm. In various embodiments, the third classifier may be a pretrained classification model. The third classifier may determine a probability that a user of the touchless lavatory 100 is gesturing toward one or more sensors or not. That is, the second classifier may infer an action of the user within the touchless lavatory 100, either gesturing or not gesturing. Gesturing may include waving a hand, a foot, a leg, an arm, or some similar motion in front of a sensor.

At block 514, processor 308 decides an action to take based on the output of blocks 508, 510, and 512. Processor 308 makes the decision based on the probability that the touchless lavatory is occupied, the probability that the user is standing or sitting, and the probability that the user is gesturing. For example, if there is a low probability that the touchless lavatory 100 is occupied, then no action should be taken. However, if there is a high probability that the touchless lavatory 100 is occupied, processor 308 may decide to turn on an overhead light and activate one or more motors based on the probability that the user is sitting, standing, and/or gesturing. As described herein, a high probability of an action occurring may be defined as the probability exceeding a threshold where the threshold is defined during the training of the classifiers at blocks 508, 510, 512 and as discussed previously. The probability of an activity occurring is then provided by the classifiers at blocks 508, 510, 512 during operation of the touchless lavatory 100. The threshold probability of an activity occurring may be different for different activities (e.g., sitting, standing, gestures, no gestures, etc.). In various embodiments, the threshold probability (i.e., high probability) of an activity occurring may be about 40% to about 100% probability of the activity occurring, and more specifically, about 50% to about 75% probability of the activity occurring. The use of the term "about" here means+/−5% probability of activity occurring.

Figure 6:
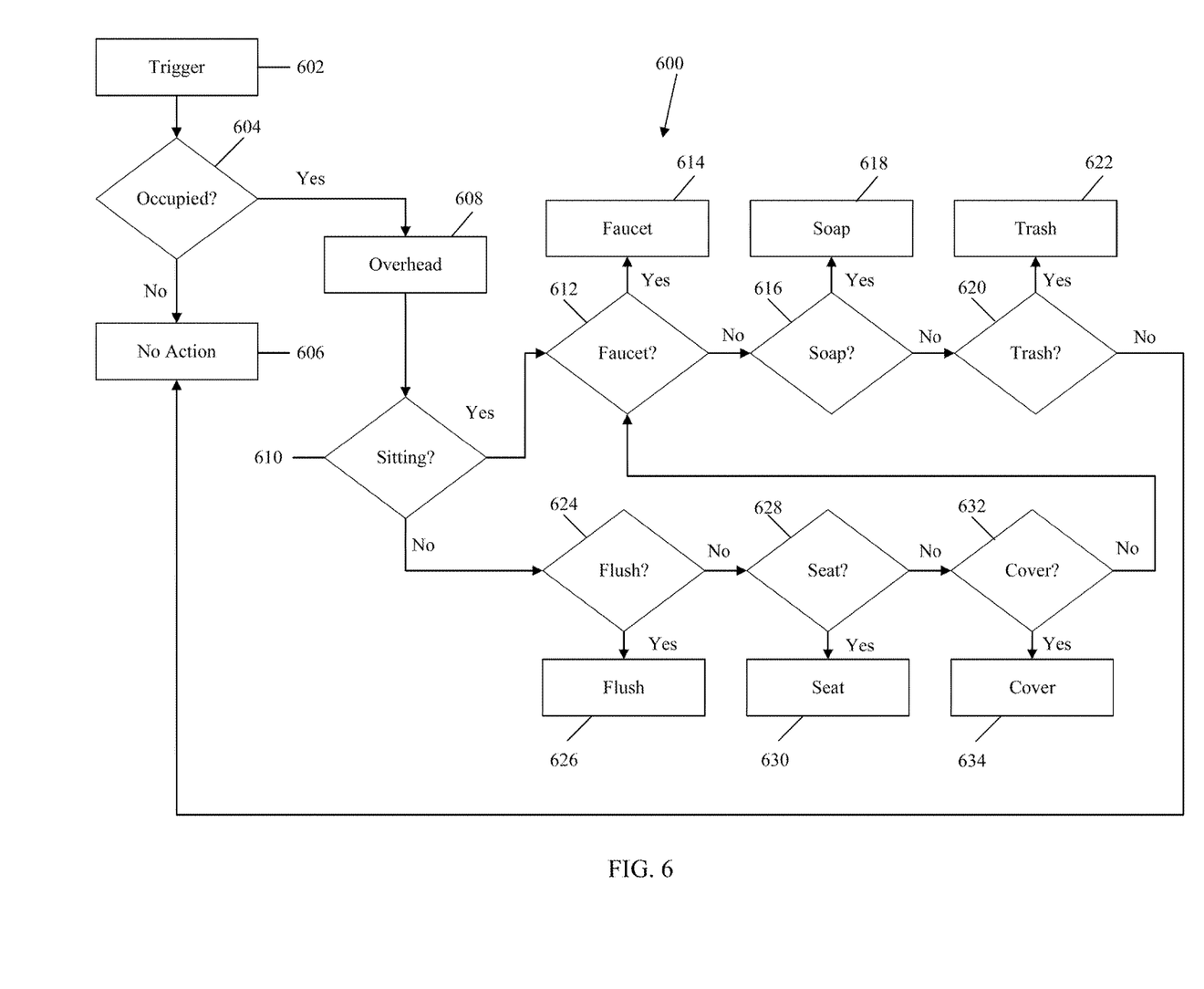
FIG. 6 illustrates an exemplary flow diagram for determining which action to take when controlling the touchless lavatory, according to various embodiments of the present disclosure.

Further discussion of the decision logic can be found below in the discussion of method 600 as illustrated in FIG. 6. While the method 600 is an exemplary method of deciding which action to take, there are other implements for deciding which action to take. For example, block 514 may implement decision trees or other machine learning methods that use the output from block 508, 510, and 512 for deciding which action to take.

At block 516, processor 308 performs the decided action. Processor 308 performs the action that is decided at block 514. After performing the action, method 500 returns to block 502 to continue aggregate, or buffer, the streaming sensor data.

Referring now to FIG. 6, in accordance with various embodiments of the present disclosure, illustrated is an exemplary method 600 for determining which action to take when controlling a touchless lavatory 100. In various embodiments, method 600 may be performed by processor 308. In various embodiments, method 600 may be performed by one or more processors in one or more computer systems. For simplicity, the discussion below will refer to processor 308 though other processors and/or systems can be used to perform method 600.

At block 602, processor 308 determines that a triggering event occurred. The determination may be provided by data output, such as from blocks 508, 510, and 512 of method 500, for example. Alternatively, the determination may be made based on data received by processor 308.

At decision block 604, processor 308 determines the probability that the touchless lavatory 100 is occupied. The probability of occupancy may be provided by the output of a machine learning model trained to identify whether or not the touchless lavatory 100 is occupied. Processor 308 may determine that the touchless lavatory 100 is occupied if the probability of being occupied is above an occupancy threshold. The occupancy threshold may be defined during training of the machine learning model that is used as the first classifier. If it is determined that the touchless lavatory 100 is not occupied, method 600 proceeds to block 606.

At block 606, no action is taken. Processor 308 returns to block 602 to wait for another triggering event. In various embodiments, process 308 may turn off an overhead light in response to the touchless lavatory 100 not being occupied.

Returning to decision block 604, if, instead, it is determined that the touchless lavatory is occupied, the method 600 proceeds to block 608.

At block 608, processor 308 turns on an overhead light. Processor 308 may be coupled to the overhead light and send an instruction to the overhead light to turn on in response to the touchless lavatory 100 being occupied.

At decision block 610, processor 308 determines whether the user is sitting or standing. Processor 308 may use the probability output by the second classifier at block 510 of method 500, for example, to determine whether the user is sitting or standing. Processor 308 may determine that the user is sitting if the probability of standing is below a sitting threshold or if the probability of standing is above a standing threshold. The sitting and standing threshold may be determined during the training of the machine learning model that is used for the second classifier. If it is determined that the user is sitting, method 600 proceeds to decision block 612.

At decision block 612, processor 308 determines whether the user is gesturing to use the faucet 114 in touchless lavatory 100. Processor 308 may use the probability output by the third classifier at block 512 of method 500, for example, to determine whether the user is gesturing to use the faucet 114. Processor 308 may determine that the user is gesturing to use the faucet 114 if the probability of gesturing near sensor 118f is above a gesturing threshold. The gesturing threshold may be set during the training of the machine learning model that is used as the third classifier. If it is determined that the user is gesturing to use the faucet 114, the method 600 proceeds to block 614.

At block 614, processor 308 activates the faucet, such as faucet 114. Processor 308 may directly communicate to a motor to activate, or turn on, faucet 114. Alternatively, processor 308 may communicate with another processor or controller to activate faucet 114. The method 600 then returns to block 602 to wait for a trigger event.

Returning to decision block 612, if, instead, it is determined that the user is not gesturing to use the faucet 114, the method 600 proceeds to decision block 616.

At decision block 616, processor 308 determines whether the user is gesturing to use the soap dispenser 112 in touchless lavatory 100. Processor 308 may use the probability output by the third classifier at block 512 of method 500, for example, to determine whether the user is gesturing to use the soap dispenser 112. Processor 308 may determine that the user is gesturing to use the soap dispenser 118 if the probability of gesturing near sensor 118e is above a gesturing threshold. The gesturing threshold may be set during the training of the machine learning model that is used as the third classifier. In various embodiments, the gesturing threshold for one sensor, such as sensor 118e, may be different than the gesturing threshold of another sensor, such as sensor 118f. If it is determined that the user is gesturing to use the soap dispenser, the method 600 proceeds to block 618.

At block 618, processor 308 activates the soap dispenser, such as soap dispenser 118. Processor 308 may directly communicate to a motor to control activate the soap dispenser 118. Alternatively, processor 308 may communicate with another processor or controller to activate soap dispenser 118. The method 600 then returns to block 602 to wait for a trigger event.

Returning to decision block 616, if, instead, it is determined that the user is not gesturing to use the soap dispenser 118, the method 600 proceeds to decision block 620.

At decision block 620, processor 308 determines whether the user is gesturing to use the trash 108 in touchless lavatory 100. Processor 308 may use the probability output by the third classifier at block 512 of method 500, for example, to determine whether the user is gesturing to use the trash 108. Processor 308 may determine that the user is gesturing to use the trash 108 if the probability of gesturing near sensor 118d is above a gesturing threshold. The gesturing threshold may be set during the training of the machine learning model that is used as the third classifier. If it is determined that the user is gesturing to use the trash 108, the method 600 proceeds to block 622.

At block 622, processor 308 activates the trash can flap, such as flap 110. Processor 308 may directly communicate to a motor to activate flap 110. Alternatively, processor 308 may communicate with another processor or controller to activate flap 110. The method 600 then returns to block 602 to wait for a trigger event.

Returning to decision block 620, if, instead, it is determined that the user is not gesturing to use the trash 108, the method 600 proceeds to block 606 where no action is taken.

Returning to decision block 610, if, instead, it is determined that the user is not sitting, method 600 proceeds to decision block 624.

At decision block 624, processor 308 determines whether the user is gesturing to flush toilet 102 in touchless lavatory 100. Processor 308 may use the probability output by the third classifier at block 512 of method 500, for example, to determine whether the user is gesturing to flush toilet 102. Processor 308 may determine that the user is gesturing to flush toilet 102 if the probability of gesturing near sensor 118a is above a gesturing threshold. The gesturing threshold may be set during the training of the machine learning model that is used as the third classifier. If it is determined that the user is gesturing to use the faucet 114, the method 600 proceeds to block 626.

At block 626, processor 308 flushes the toilet, such as toilet 102. Processor 308 may directly communicate to a motor to activate, or flush, toilet 102. Alternatively, processor 308 may communicate with another processor or controller to activate, or flush, toilet 102. The method 600 then returns to block 602 to wait for a trigger event.

Returning to decision block 624, if, instead, it is determined that the user is not gesturing to use the faucet 114, the method 600 proceeds to decision block 628.

At decision block 628, processor 308 determines whether the user is gesturing to raise or lower seat 106 in touchless lavatory 100. Processor 308 may use the probability output by the third classifier at block 512 of method 500, for example, to determine whether the user is gesturing to raise or lower seat 106. Processor 308 may determine that the user is gesturing to raise or lower seat 106 if the probability of gesturing near sensor 118b is above a gesturing threshold. The gesturing threshold may be set during the training of the machine learning model that is used as the third classifier. If it is determined that the user is gesturing to use the faucet 114, the method 600 proceeds to block 630.

At block 630, processor 308 activates the seat, such as seat 106 to raise or lower seat 106. Processor 308 may directly communicate to a motor to move seat 106. Alternatively, processor 308 may communicate with another processor or controller to move seat 106. The method 600 then returns to block 602 to wait for a trigger event.

Returning to decision block 628, if, instead, it is determined that the user is not gesturing to move seat 106, the method 600 proceeds to decision block 632.

At decision block 632, processor 308 determines whether the user is gesturing to raise or lower cover 104 in touchless lavatory 100. Processor 308 may use the probability output by the third classifier at block 512 of method 500, for example, to determine whether the user is gesturing to raise or lower cover 104. Processor 308 may determine that the user is gesturing to raise or lower cover 104 if the probability of gesturing near sensor 118c is above a gesturing threshold. The gesturing threshold may be set during the training of the machine learning model that is used as the third classifier. If it is determined that the user is gesturing to use the faucet 114, the method 600 proceeds to block 634.

At block 634, processor 308 moves the cover, such as cover 104, to raise or lower the cover. Processor 308 may directly communicate to a motor to activate, or move, cover 104. Alternatively, processor 308 may communicate with another processor or controller to activate, or move, cover 104. The method 600 then returns to block 602 to wait for a trigger event.

Returning to decision block 632, if, instead, it is determined that the user is not gesturing to raise or lower cover 104, the method 600 proceeds to decision block 612.

As illustrated in method 600, processor 308 may enable and disable different actions based on a state of the touchless lavatory 100 or the user. For example, all actions are disabled if the touchless lavatory 100 is determined to be unoccupied. As another example, actions to flush the toilet or move the seat and/or cover are disabled when it is determined the user is sitting. However, when it is determined that the user is standing, all actions are available.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of controlling a touchless lavatory, comprising:
    collecting, by a processor, sensor data from a set of sensors, the sensor data including an ambient light measurement, proximity information, and an indication of motion;
    aggregating, by the processor, the collected sensor data for a time window;
    extracting, by the processor, features for the time window from the aggregated sensor data;
    determining, by the processor, a probability of an activity of a user occurring based on the extracted features; and
    activating, by the processor, a motor based on the determining that the probability exceeds a threshold, the motor being configured to control a component of the touchless lavatory, wherein the determining the probability of the activity of the user occurring includes using at least one pretrained classification model to determine the probability of the activity, and wherein the at least one pretrained classification model includes a first pretrained classification model to determine an occupancy status based on the aggregated sensor data and the extracted features, a second pretrained classification model to determine a sitting status based on the aggregated sensor data and the extracted features, and a third pretrained classification model to determine a gesture status based on the aggregated sensor data and the extracted features.

2. The method of claim 1, wherein the sensor data is collected at discrete time intervals of about 0.05 seconds to about 0.5 seconds.

3. The method of claim 1, wherein the time window is about 0.5 seconds to about 2 seconds.

4. The method of claim 1, wherein the second pretrained classification model further determines an orientation status based on the aggregated sensor data and the extracted features.

5. The method of claim 1, wherein the time window begins when a previous window ends.

6. A touchless lavatory sensor control system, comprising:
a set of sensors configured to transmit sensor data;
a motor coupled to the set of sensors and configured to control a component of the touchless lavatory; and
a controller operatively coupled with the set of sensors and the motor, wherein the controller is configured to:
collect sensor data, the sensor data including an ambient light measurement, proximity information, and an indication of motion;
aggregate the collected sensor data for a time window;
extract features for the time window from the aggregated sensor data;
determine a probability of an activity of a user occurring based on the extracted features; and
and transmit instructions to activate the motor based on the probability exceeding a threshold,
wherein the determining the probability of the activity of the user occurring includes using at least one pretrained classification model to determine the probability of the activity, and
wherein the at least one pretrained classification model includes a first pretrained classification model to determine an occupancy status based on the aggregated sensor data and the extracted features, a second pretrained classification model to determine a sitting status based on the aggregated sensor data and the extracted features, and a third pretrained classification model to determine a gesture status based on the aggregated sensor data and the extracted features.

7. The touchless lavatory sensor control system of claim 6, wherein each sensor is configured to transmit the sensor data at discrete time intervals of about 0.05 seconds to about 0.5 seconds.

8. The touchless lavatory sensor control system of claim 6, wherein the time window is of about 0.5 seconds to about 2 seconds.

9. The touchless lavatory sensor control system of claim 6, wherein the time window overlaps with a previous time window.

10. The touchless lavatory sensor control system of claim 6, wherein the time window begins at the end of a previous time window.

11. A method of controlling a touchless lavatory, comprising:
receiving, by a processor, a triggering event;
collecting, by a processor, sensor data from a set of sensors, the sensor data including an ambient light measurement, proximity information, and an indication of motion;
aggregating, by the processor, the collected sensor data for a time window;
extracting, by the processor, features for the time window from the aggregated sensor data;
determining, by the processor, whether a space is occupied, wherein determining whether the space is occupied comprises:
determining, by the processor, a probability of the space is occupied based on the extracted features; and
activating, by the processor, an overhead light based on the determining that the probability of the space being occupied exceeds a first threshold; and
determining, by the processor, a state of a user within the space, wherein determining the state of the user comprises:
determining, by the processor, a probability of an activity of the user occurring based on the extracted features; and
responsive to determining that the probability of the activity exceeds a second threshold, sending, by the processor, a command to a motor configured to control a component of the touchless lavatory in response to the state of the user.

12. The method of claim 11, wherein the state of the user includes one of sitting and standing.

13. The method of claim 11, further comprising:
responsive to determining that the probability of the activity exceeds the second threshold, determining, by the processor, a first activity of the user within the space; and
sending, by the processor, a first command to the motor to control the component of the touchless lavatory in response to the determined first activity.

14. The method of claim 13, wherein the first activity of the user includes a movement of user of at least one of a hand, an arm, a foot, and a leg.

15. The method of claim 13, further comprising:
responsive to determining that the probability of the activity exceeds the second threshold, determining, by the processor, a second activity of the user within the space; and
sending, by the processor, a second command different from the first command to the motor to control the component of the touchless lavatory in response to the determined second activity.

* * * * *